(12) United States Patent
Hagari (10) Patent No.: US 9,494,489 B2
(45) Date of Patent: Nov. 15, 2016

(54) INTERNAL COMBUSTION ENGINE INNER-CYLINDER PRESSURE ESTIMATION APPARATUS

(71) Applicant: Mitsubishi Electric Corporation, Chiyoda-ku, Tokyo (JP)

(72) Inventor: Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 325 days.

(21) Appl. No.: 14/177,836

(22) Filed: Feb. 11, 2014

(65) Prior Publication Data

US 2015/0142294 A1    May 21, 2015

(30) Foreign Application Priority Data

Nov. 15, 2013    (JP) ................................. 2013-236436

(51) Int. Cl.
| | | |
|---|---|---|
| G01M 15/00 | (2006.01) | |
| G01M 15/08 | (2006.01) | |
| F02D 35/02 | (2006.01) | |

(52) U.S. Cl.
CPC ............ *G01M 15/08* (2013.01); *F02D 35/024* (2013.01); *F02D 35/026* (2013.01); *F02D 35/028* (2013.01)

(58) Field of Classification Search
CPC .. G01M 15/08; F02D 35/026; F02D 35/024; F02D 35/028
See application file for complete search history.

(56) References Cited

U.S. PATENT DOCUMENTS

| | | | | |
|---|---|---|---|---|
| 6,530,361 | B1 * | 3/2003 | Shiraishi | F02B 1/12 123/305 |
| 2004/0084020 | A1 * | 5/2004 | Daniels | F01N 3/2006 123/406.23 |

| | | | |
|---|---|---|---|
| 2004/0181377 | A1 | 9/2004 | Teraji et al. |
| 2005/0197762 | A1 | 9/2005 | Yoshino et al. |

(Continued)

FOREIGN PATENT DOCUMENTS

| | | |
|---|---|---|
| CN | 1657767 A | 8/2005 |
| JP | 2004-293541 A | 10/2004 |

(Continued)

OTHER PUBLICATIONS

Communication dated Sep. 26, 2014, issued by the German Patent Office in corresponding German Application No. 10 2014 204 109.0.

(Continued)

*Primary Examiner* — Hieu T Vo
*Assistant Examiner* — Sherman Manley
(74) *Attorney, Agent, or Firm* — Sughrue Mion, PLLC; Richard C. Turner (57) ABSTRACT

An internal combustion engine inner-cylinder pressure estimation apparatus includes a detection unit that detects an operation condition of an internal combustion engine, a calculation unit that calculates an ignition delay that is an interval from an ignition timing to a starting timing of heat generation by combustion, based on an operation condition detected by the detection unit, and a combustion velocity calculation unit that calculates a combustion velocity, based on the operation condition. There is simulated a phenomenon that after an ignition delay period following an ignition timing has elapsed, a flame generated at the gap portion of an ignition plug expands up to the inner-cylinder wall surface at the combustion velocity and in the shape of an ellipsoid whose center is the gap portion of the ignition plug.

7 Claims, 8 Drawing Sheets

(56) References Cited

U.S. PATENT DOCUMENTS

| | | | | |
|---|---|---|---|---|
| 2009/0259383 | A1* | 10/2009 | Wang | F02D 35/023 |
| | | | | 701/102 |
| 2013/0133632 | A1* | 5/2013 | Sano | F02D 35/023 |
| | | | | 123/568.11 |
| 2013/0160521 | A1* | 6/2013 | Makartchouk | F01N 3/208 |
| | | | | 73/23.31 |
| 2015/0142294 | A1* | 5/2015 | Hagari | G01M 15/08 |
| | | | | 701/101 |

FOREIGN PATENT DOCUMENTS

| | | |
|---|---|---|
| JP | 2004-332658 A | 11/2004 |
| JP | 2008-215204 A | 9/2008 |

OTHER PUBLICATIONS

Wilhelm Endres, "Der Verbrennungsvorgang im Gas- und Vergaser-Motor", Versuch einer rechnerischen Erfassung der einselnen Einflusse und ihres Zusammenwirkens, Berlin, Springer Verlag, 1928, 87 pages total.

Christian Barba, "Erarbeitung von Verbrennungskennwerten aus Indizierdaten zur verbesserten Prognose und rechnerischen Simulation des Verbrennungsablaufes bei Pkw-DE-Dieselmotoren mit Common-Rail-Einspritzung", Zurich, Dissertation, 2001, 196 pages total.

Communication dated Jul. 15, 2016, issued by the State Intellectual Property Office of the P.R.C. in corresponding Chinese Application No. 201410359408.8.

* cited by examiner

INTERNAL COMBUSTION ENGINE INNER-CYLINDER PRESSURE ESTIMATION APPARATUS

BACKGROUND OF THE INVENTION

1. Field of the Invention

The present invention relates to an internal combustion engine inner-cylinder pressure estimation apparatus and more particularly to an internal combustion engine inner-cylinder pressure estimation apparatus that can simulate the present inner-cylinder pressure in real time.

2. Description of the Related Art

Because of the recent environmental and energy problems, an internal combustion engine control apparatus is required to further improve gasoline mileage. For this requirement, to date, the ignition timing has been optimized so as to approach the MBT (Minimum Advance for Best Torque), the pumping loss and the internal EGR amount have been optimized by a VVT (Variable Valve Timing) mechanism, and the Atkinson cycle has been achieved through intake-valve delayed closing utilizing the VVT mechanism; furthermore, the pumping loss and the external EGR amount have been optimized also by an EGR (Exhaust Gas Recirculation) mechanism.

As described above, in order to appropriately control a great number of control parameters, the inner-cylinder pressure is measured and the optimum operation condition is studied so that gasoline mileage is improved; however, because in order to implement the optimization, a massive amount of data is required originally, the number of measurement points are decreased by use of a DoE (Design of Experiments) or the like, and statistic modeling through a MBC (Model-Based Calibration), numerical optimization, or the like is also utilized so that the number of maps required for the control is decreased.

The foregoing method is for the optimization of control parameters that utilizes a statistic model; however, there has also been studied optimization of the ignition timing or the like in which instead of a statistic model, a physical model is utilized. In other words, through a physical model, the inner-cylinder intake air amount and the EGR amount are calculated from the control amounts for the VVT and the EGR and the outputs of various kinds of sensors, and then based on the calculated intake air amount, the calculated EGR amount, and the calculated ignition timing, a combustion simulation based on the physical model is implemented and then the inner-cylinder pressure is estimated, so that even under an operation condition in which the inner-cylinder pressure is not measured, the control amounts of the VVT, the ECR, the ignition timing at a time when the gasoline mileage is best are calculated so that the respective control parameters are optimized.

Moreover, due to the performance improvement of a microcomputer utilized as the control apparatus of an internal combustion engine, it has also been studied that a combustion simulation is implemented in real time while the internal combustion engine is controlled, so that the estimation of the inner-cylinder pressure and the optimization of various kinds control amounts are performed.

As an example of combustion model, among physical models, that is utilized in a combustion simulation in particular, for example, in a method disclosed in Japanese Patent Application Laid-Open No. 2004-293541 (Patent Document 1), a combustion physical model is established by estimating the flame propagation based on a flame growth through turbulent combustion and a flame growth through laminar combustion. In addition, for example, in a method disclosed in Japanese Patent Application Laid-Open No. 2009-332658 (Patent Document 2), a main combustion period is calculated based on a laminar combustion velocity and then an MBT ignition timing is calculated based on the main combustion period. As an approach that is different from such combustion simulations close to a combustion physical model, for example, in a method disclosed in Japanese Patent Application Laid-Open No. 2008-215209 (Patent Document 3), simulation of a heat generation rate is implemented by use of a Wiebe function for approximating a fuel ratio.

PRIOR ART REFERENCE

Patent Document

[Patent Document 1] Japanese Patent Application Laid-Open No. 2004-293542
[Patent Document 2] Japanese Patent Application Laid-Open No. 2004-332658
[Patent Document 3] Japanese Patent Application Laid-Open No. 2008-215204

However, although in each of the methods disclosed in Patent Documents 1 and 2, there is implemented a combustion simulation that is close, to some extent, to a combustion physical model that is known now, the actual inner-cylinder combustion phenomenon is extremely complex and hence it is difficult to make high-accuracy estimation with the quantity of calculation at such a level as performing mounting in an internal combustion engine control apparatus and performing simulation in real time.

Because in the method disclosed in Patent Document 3, the progress status of combustion is approximated, it is required to change constants in the Wiebe function in accordance with the inner-cylinder shape and the operation condition, although the quantity of calculation is small; therefore, when in accordance with the inner-cylinder shape, the curve of the heat generation rate is complex (e.g., when the left and right sides of the curve of the heat generation rate are asymmetric with respect to the peak of the curve), an high-accuracy simulation requires a great number of constants and matching of those constants, for example, it is required to perform fitting by use of a plurality of Wiebe functions.

SUMMARY OF THE INVENTION

The present invention has been implemented in order to solve the foregoing problems; the objective thereof is to provide an internal combustion engine inner-cylinder pressure estimation apparatus that can accurately estimate the behavior of the inner-cylinder pressure by use of a combustion model having fewer constants.

An internal combustion engine inner-cylinder pressure estimation apparatus according to the present invention includes an operation condition detection unit that detects an operation condition of an internal combustion engine, an ignition delay calculation unit that calculates an ignition delay, which is an interval from an ignition timing to a starting timing of heat generation by combustion, based on the operation condition detected by the operation condition detection unit, and a combustion velocity calculation unit that calculates a combustion velocity, based on the operation condition. There is simulated a phenomenon that after an ignition delay period following an ignition timing has elapsed, a flame generated at the gap portion of an ignition plug expands up to the inner-cylinder wall surface at the combustion velocity and in the shape of an ellipsoid whose center is the gap portion of the ignition plug; the inside and the outside of the flame are defined as a combusted portion and a non-combusted portion, respectively, and respective inner-cylinder pressures of the combusted portion and the non-combusted portion are calculated; then, the whole inner-cylinder pressure is estimated based on the inner-cylinder pressures of the combusted portion and the non-combusted portion.

An internal combustion engine inner-cylinder pressure estimation apparatus according to the present invention makes it possible to accurately estimate the behavior of an inner-cylinder pressure, by use of a small number of control constant.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5A is a graph representing an ignition delay and a combustion velocity; FIG. 5A shows the relationship between the crank angle and the combustion rate;

FIG. 5B is a graph representing an ignition delay and a combustion velocity; FIG. 5B shows the relationship between the crank angle and the heat generation rate;

FIG. 5C is a graph representing an ignition delay and a combustion velocity; FIG. 5C shows the relationship between the crank angle and the combustion speed;

FIG. 5D is a graph representing an ignition delay and a combustion velocity; FIG. 5D shows the relationship between the crank angle and the corrected combustion speed;

DETAILED DESCRIPTION OF THE PREFERRED EMBODIMENTS

Hereinafter, a preferred embodiment of an internal combustion engine inner-cylinder pressure estimation apparatus according to the present invention will be explained with reference to the drawings.

Embodiment 1

Figure 1:
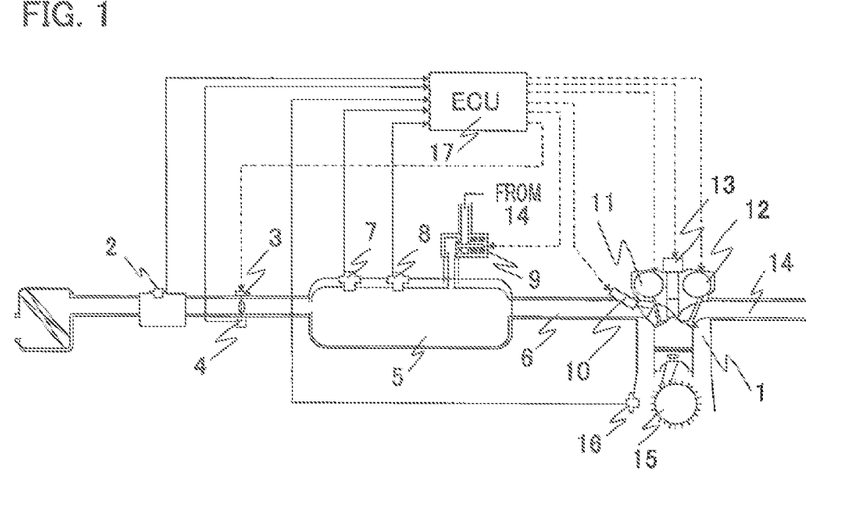
FIG. 1 is a configuration diagram schematically illustrating an internal combustion engine to which an inner-cylinder pressure estimation apparatus according to Embodiment 1 of the present invention is applied.
Figure 2:
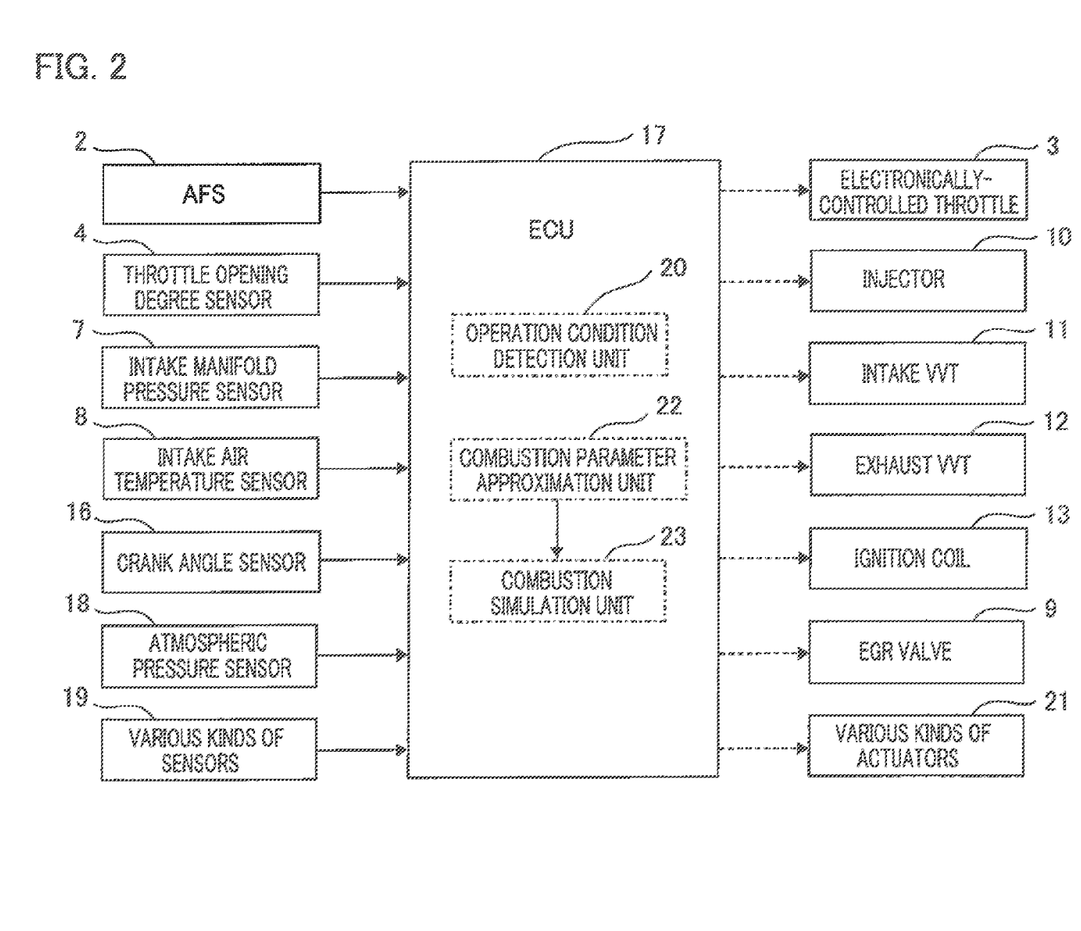
FIG. 2 is a configuration diagram schematically illustrating an internal combustion engine control apparatus to which an inner-cylinder pressure estimation apparatus according to Embodiment 1 of the present invention is applied.

FIG. 1 is a configuration diagram schematically illustrating an internal combustion engine (hereinafter, referred to as an engine) to which an inner-cylinder pressure estimation apparatus according to Embodiment 1 of the present invention is applied; FIG. 2 is a block diagram schematically illustrating the control apparatus for the engine.

In FIG. 1, an air flow sensor (referred to as an AFS, hereinafter) 2 that detects an intake air amount is provided at the upstream side of the intake system of an engine 1. At the engine 1 side, i.e., at the downstream side of the AFS 2, an electronically-controlled throttle 3 that can electrically be controlled to adjust an intake air amount is provided. In order to measure the opening degree of the electronically-controlled throttle valve 3, a throttle opening degree sensor 4 is provided. It may be allowed that instead of the AFS 2, another unit is utilized that measures an intake air amount, for example, in such a manner as to estimate the intake air amount based on an intake manifold pressure, described later.

Furthermore, there are provided an intake manifold pressure sensor 7 that measures the pressure (hereinafter, referred to as an intake manifold pressure) in a space (referred to as an intake manifold, hereinafter) including a surge tank 5 and an intake manifold 6 provided at the downstream side of the electronically-controlled throttle 3 and an intake air temperature sensor 8 that measures the temperature inside the intake manifold (referred to as an intake manifold temperature, hereinafter). It may also be allowed that instead of providing the intake air temperature sensor 8 that measures an intake manifold temperature, a temperature sensor, such as a temperature sensor included in the AFS 2, that approximately measures the outer air is utilized and the intake manifold temperature is estimated from the temperature of the outer air, although strictly speaking, the estimated temperature differs from the temperature measured by use of the intake air temperature sensor 8.

Moreover, the surge tank 5 is connected with a path from an EGR valve 9 for introducing an external EGR originated in the exhaust system. An injector 10 for injecting a fuel is provided in the vicinity of the intake valve including the intake manifold 6 and the inside of the cylinder; an intake VVT 11 and an exhaust VVT 12 for changing the valve timing so as to control an internal EGR are provided in the intake valve and the exhaust valve, respectively; an ignition coil 13 for driving an ignition plug that produces a spark in a cylinder is provided on the cylinder head. A catalyst, an $O_2$ sensor, and a path to the EGR valve 9, which are unillustrated, are provided in an exhaust manifold 14. Moreover, there is provided a crank angle sensor 16 that detects an engine rotation speed and a crank angle from the edge of a rotation plate 15 mounted on the crank shaft of the engine 1.

In addition, an electronic control unit (referred to as an ECU, hereinafter) 17 is provided; as illustrated in FIG. 2, an intake air amount measured by the AFS 2, an opening degree of the electronically-controlled throttle 3 measured by the throttle opening degree sensor 4, an intake manifold pressure measured by the intake manifold pressure sensor 7, an intake manifold temperature measured by the intake air temperature sensor 8, an edge of the rotation plate 15 detected by the crank angle sensor 16, and an atmospheric pressure measured by atmospheric pressure sensor 18 are inputted to the ECU 17. Instead of the atmospheric pressure sensor 18 for measuring an atmospheric pressure, either a unit for estimating an atmospheric pressure or an atmospheric pressure sensor incorporated in the ECU may be utilized. Measurement values are also inputted to the ECU 17 from various sensors 19 (including an accelerator opening degree sensor and an O2 sensor, which are unillustrated).

An operation condition detection unit 20 in the ECU 17 calculates the engine rotation speed and the crank angle from the edge cycle of the rotation plate 15 and also calculates the cylinder intake air amount and the EGR ratio from an intake air amount, an intake manifold pressure, and the like. Based on the cylinder intake air amount and the EGR ratio calculated by the operation condition detection unit 20, the injector 10, the ignition coil 13, and the like are driven. A desired torque is calculated based on various kinds of inputted data items such as the accelerator opening degree and the like; a desired cylinder intake air amount for achieving the calculated desired torque is calculated; a desired throttle valve opening degree, a desired intake VVT phase angle, a desired exhaust VVT phase angle, and a desired EGR opening degree are calculated so that the desired cylinder intake air amount and the desired EGR ratio are achieved; based on these desired values, the opening degree of the electronically-controlled throttle 3, the respective phase angles of the intake VVT 11 and the exhaust VVT 12, and the opening degree of the EGR valve 9 are controlled. Furthermore, other various kinds of actuators 21 are also controlled, as may be necessary.

In addition to such normal engine control as described above, combustion simulation is concurrently implemented in the ECU 17. Based on the operation condition obtained by the operation condition detection unit 20, a combustion parameter approximation unit 22 calculates combustion parameters necessary for the combustion simulation and based on the operation condition and the combustion parameters, a combustion simulation unit 23 performs the combustion simulation.

Figure 3:
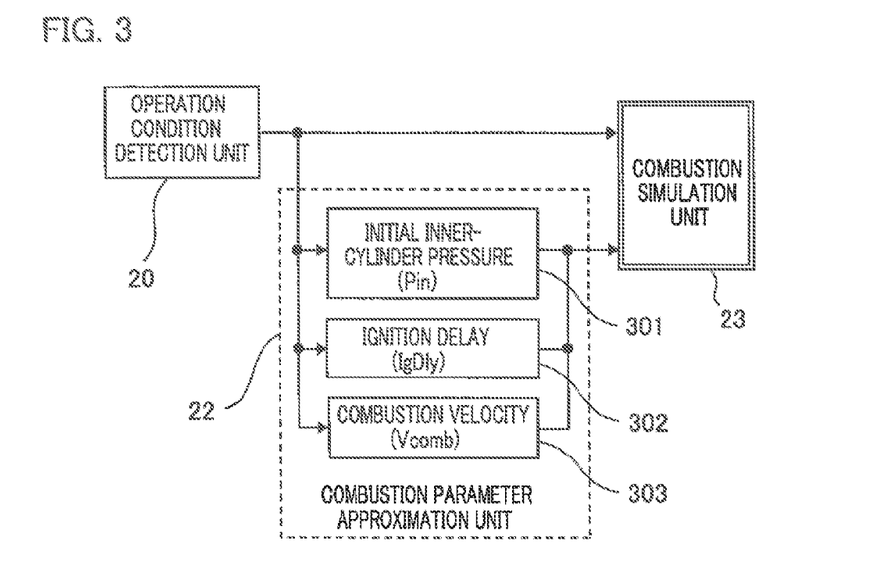
FIG. 3 is a block diagram illustrating a combustion parameter approximation unit.

The combustion parameter approximation unit 22 will be explained with reference to FIG. 3. FIG. 3 is a block diagram illustrating the combustion parameter approximation unit 22. As described above, the operation condition detection unit 20 calculates operation condition parameters utilized in normal engine control, i.e., an engine rotation speed (Ne), a filling efficiency (Ec), an ignition timing (IG), an air-fuel ratio (AFR), an EGR ratio (InEGR: internal EGR ratio, ExEGR: external EGR ratio, EGR: total EGR ratio (=InEGR+ExEGR)) VVT phase angle (InVVT: intake side, ExVVT: exhaust side), an intake manifold pressure (Pb), and the like are calculated. Meanwhile, in order to implement combustion simulation, parameters related to the inner-cylinder pressure and parameters related to combustion are required in addition to the foregoing parameters. Accordingly, the combustion parameter approximation unit 22 calculates an initial inner-cylinder pressure (Pin) in the block 301, an ignition delay (IgDly) in the block 302, and a combustion velocity (Vcomb) in the block 303. The block 301 is an initial inner-cylinder pressure calculation unit; the block 302 is an ignition delay calculation unit; the block 303 is a combustion velocity calculation unit.

At first, a method of calculating the initial inner-cylinder pressure (Pin) in the block 301 will be explained. The initial inner-cylinder pressure (Pin) is the inner-cylinder pressure at a time when the compression stroke is started (at the bottom dead center). In general, with regard to the compression stroke of an engine, it is known that in a state transition period, from a time point when the intake valve is closed to a time point when ignition is started, during which air is neither taken in nor exhausted, the inner-cylinder volume (V) and the inner-cylinder pressure (P) can be described as a polytropic change represented by the equation (1) below. In the equation (1), n denotes a polytropic index.

$$PV^n = \text{Constant} \quad (1)$$

Figure 4:
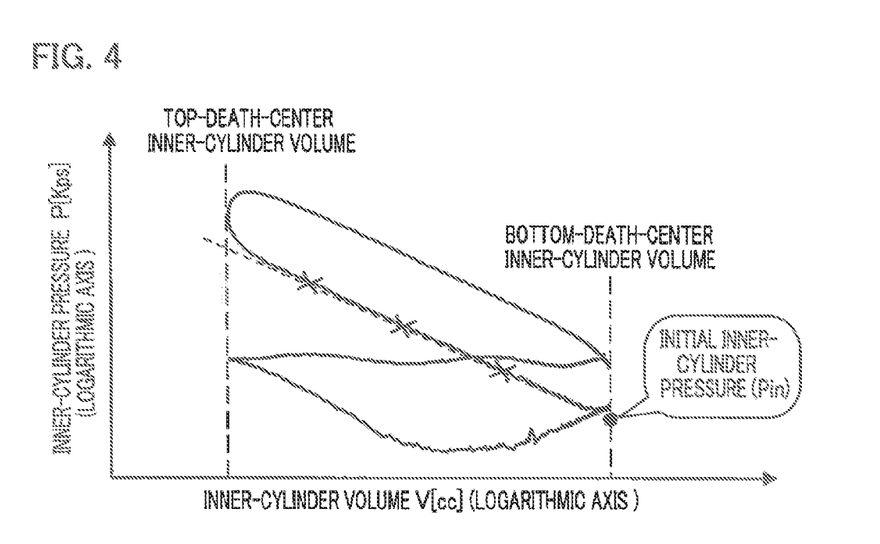
FIG. 4 is an inner-cylinder pressure vs. inner-cylinder volume chart representing an initial inner-cylinder pressure.

The inner-cylinder pressure at the bottom dead center (BTDC180 degCA) calculated by use of the equation (1) from the inner-cylinder pressure vs. inner-cylinder volume characteristic represented by "x" marks, as represented in FIG. 4, is defined as an initial inner-cylinder pressure. The initial inner-cylinder pressures under each operation condition is preliminarily calculated by use of an inner-cylinder pressure measured, for example, through a DoE or the like, under a predetermined operation condition and then the calculated inner-cylinder pressure are preliminarily approximated by use of the operation conditions (such as the engine rotation speed, the intake manifold pressure, and the VVT phase angle), so that the initial inner-cylinder pressure can be calculated in the block 301 in FIG. 3. A linear approximation equation, as an example of approximation equation for calculating the initial inner-cylinder pressure (Pin), can be expressed by the equation (2) below, by use of the engine rotation speed (Ne), the intake manifold pressure (Pb), the intake VVT phase angle (InVVT), and the exhaust VVT phase angle (ExVVT). In the equation (2), K*_Pin denotes a proportionality coefficient, and Kcnt_Pin denotes a constant term.

$$P_{in} = Kcnt\_P_{in} + Kne\_P_{in} \times Ne + Kpb\_P_{in} \times Pb + Kinvvt\_P_{in} \times InVVT + Kexvvt\_P_{in} \times ExVVT \quad (2)$$

The approximation equation for calculating the initial inner-cylinder pressure (Pin) is not limited to the equation (2); parameters that represent more operation conditions may be utilized, or a higher-order approximation equation such as a quadratic equation or a cubic equation may be utilized.

Next, the method of calculating the ignition delay (IgDly) illustrated in the block 302 and the combustion velocity (Vcomb) illustrated in the block 303 will be explained.

Figure 5A:
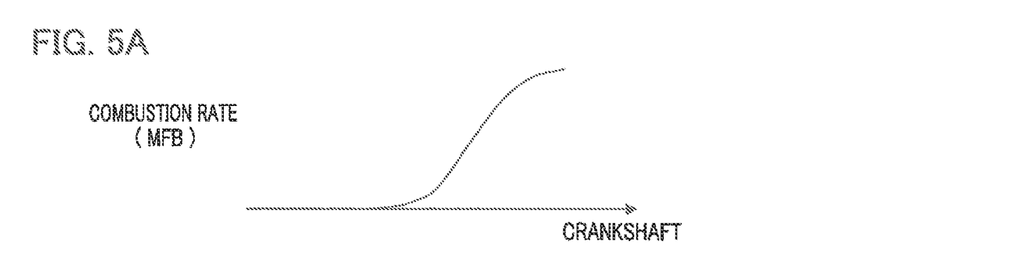
Figure 5B:
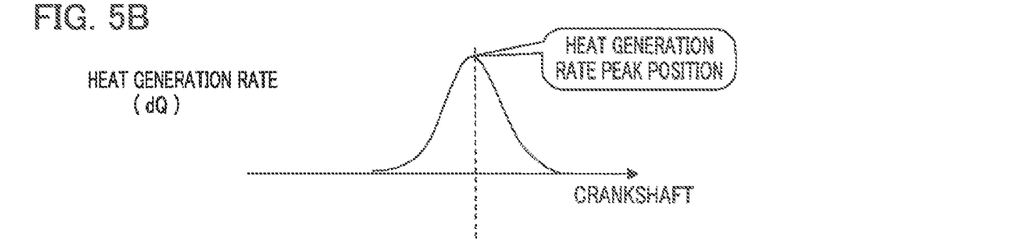
Figure 5C:
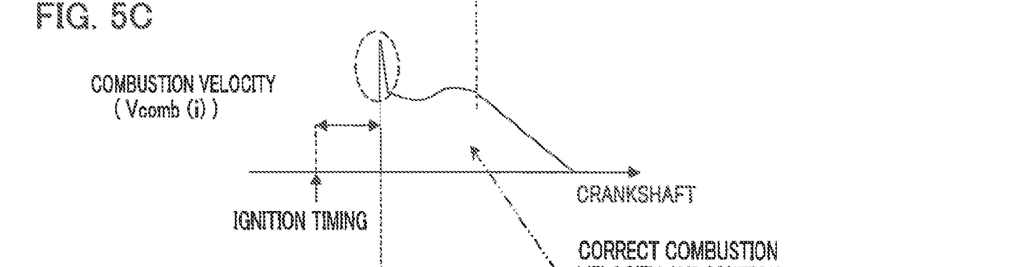
Figure 5D:
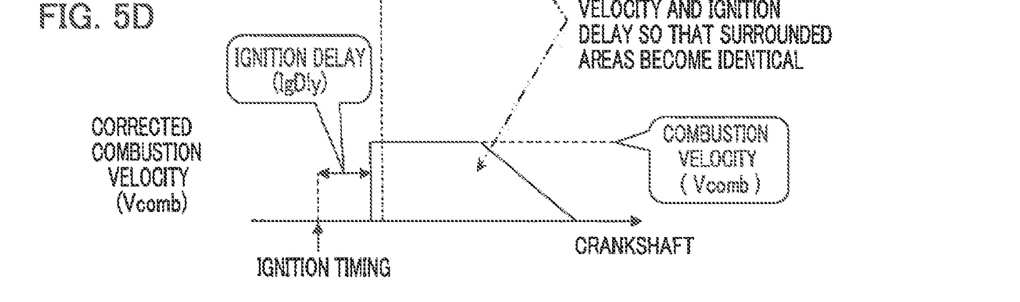

At first, based on an example of combustion velocity calculated through after-mentioned methods represented in FIGS. 5A through 5D, the definitions of the ignition delay and the combustion velocity will be explained. FIG. 5A represents the relationship between the crank angle and the combustion rate (MFB); FIG. 5B represents the relationship between the crank angle and the heat generation rate (dQ); FIG. 5C represents the relationship between the crank angle and the combustion velocity (Vcomb (i)); FIG. 5D represents the relationship between the crank angle and the corrected combustion velocity (Vcomb). As represented in FIG. 5D, the ignition delay is defined as a delay period from a time point when ignition is started to a time point when the combustion velocity rises; the operation of obtaining the delay period is performed by a real ignition delay period calculation unit. As the unit of the foregoing delay period, either the time [ms] or the crank angle [degCA] may be utilized.

As represented in FIG. 5C, in some cases, when combustion starts, a surge may occur in the combustion velocity; as described later, the ignition delay may be corrected while taking the surge into consideration. The combustion velocity is defined as the average value of the portion, of a combustion velocity, that excludes the initial surge portion at a time when combustion starts and the tapering potion in the latter part of the combustion. As is the case with the calculation of the initial inner-cylinder pressure, the ignition delay and the combustion velocity are preliminarily calculated by use of an inner-cylinder pressure measured through a DoE or the like, under a predetermined operation condition and then the calculated ignition delay and combustion velocity are approximated by use of the operation conditions (such as the engine rotation speed, the filling efficiency, the ignition timing, the air-fuel ratio, and the EGR ratio), so that the ignition delay and the combustion velocity can be calculated. A linear approximation equation, as examples of approximation equations for calculating the ignition delay (IgDly) and the combustion velocity (Vcomb), can be expressed by the following equations (3) and (4), respectively, by use of the engine rotation speed (Ne), the filling efficiency (Ec), the ignition timing (IG), the air-fuel ratio (AFR), and the EGR ratio (EGR). In the equations (3) and (4), K*_* denotes a proportionality coefficient, and Kcnt_* denotes a constant term.

IgDly=Kcnt_IgDly+Kne_IgDly×Ne+Kec_IgDly×Ec+ Kig_IgDly×IG+Kafr_IgDly×AFR+Kegr_IgDly× EGR (3)

$V_{comb}$=Kcnt_$V_{comb}$+Kne_$V_{comb}$×Ne+Kec_$V_{comb}$×Ec+ Kig_$V_{comb}$×IG+Kafr_$V_{comb}$×AFR+Kegr_$V_{comb}$× EGR (4)

The equation (3) corresponds to an ignition delay approximation unit, which is an embodiment of the ignition delay calculation unit, and the equation (4) corresponds to a combustion velocity approximation unit, which is an embodiment of the combustion velocity calculation unit; however, the approximation equations for calculating the ignition delay (IgDly) and the combustion velocity (Vcomb) are not limited to the equations (3) and (4); parameters that represent more operation conditions may be utilized, or a higher-order approximation equation such as a quadratic equation or a cubic equation may be utilized. As represented in FIG. 5C, the combustion velocity is likely to gradually decrease from the vicinity of the peak position of the heat generation rate; therefore, in the combustion simulation, described later, the combustion velocity may be corrected in such a way that it gradually decreases after it is detected that the heat generation rate has reached the peak.

The combustion simulation unit 23 implements combustion simulation by use of the operation condition calculated by the operation condition detection unit 20, the initial inner-cylinder pressure calculated by the combustion parameter approximation unit 22, the ignition delay, and the combustion velocity.

Figure 6:
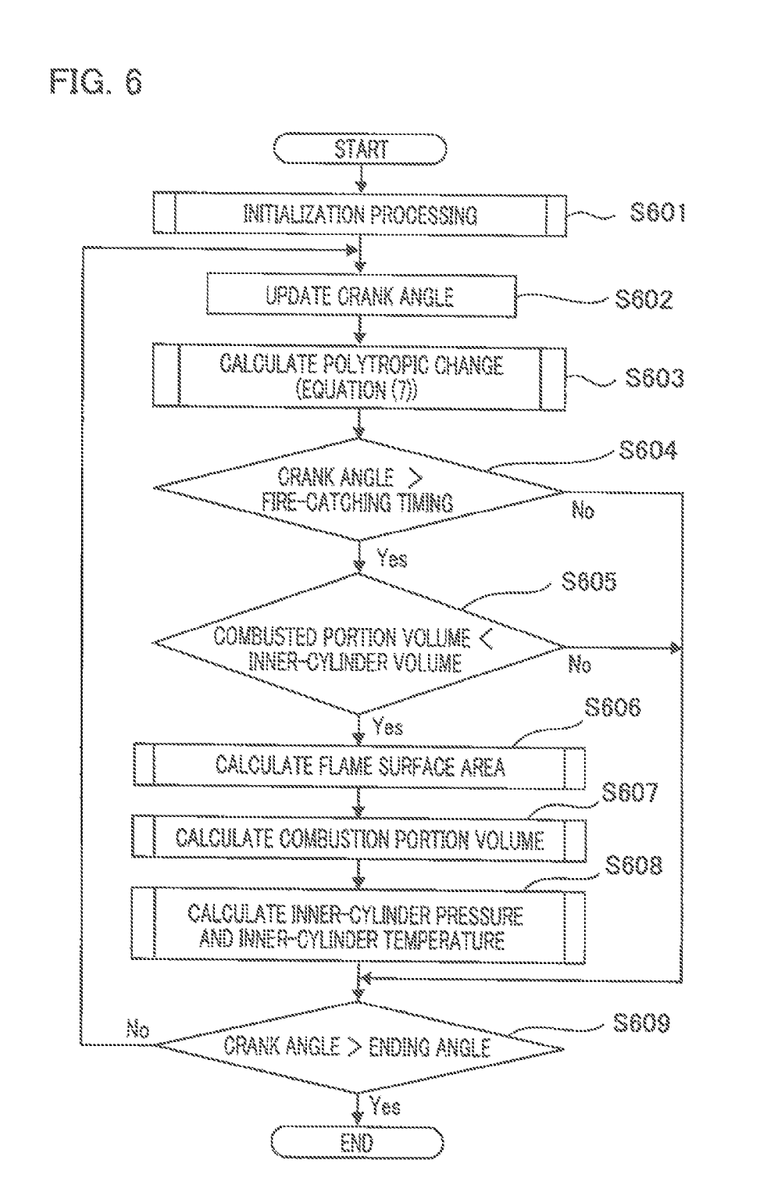
FIG. 6 is a flowchart representing the calculation contents of a combustion simulation.

Next, the calculation performed by the combustion simulation unit 23 will be explained with reference to FIG. 6. FIG. 6 is a flowchart representing the calculation contents of a combustion simulation. This calculation is performed within a crank angle of 360 [degCA] from the start of the compression stroke (the bottom dead center) to the end of the power stroke (the bottom dead center). More particularly, the calculation may be performed in interrupt processing within a predetermined crank angle or may be separately performed in interrupt processings within a plurality of crank angles. Moreover, the calculation may separately be implemented in interrupt processing performed every predetermined time. Ideally, it is desired that the calculation can be completed within the crank angle of 360 [degCA] in the whole operation range; however, when the calculation processing cannot be completed in a high-rotation range, a one-combustion calculation may be performed in a crank angle of, for example, 720 [degCA], i.e., while the engine rotates twice.

In the step 601, at first, initialization processing for the combustion simulation is implemented. In the initialization processing, the initial inner-cylinder pressure (Pin) is substituted, as the initial value, for the inner-cylinder pressure (Pcyl), and −180 [degCA], which corresponds to the starting point (the bottom dead center) of the compression stroke, is substituted, as the initial value, for the crank angle (Ang); then, based on the equation (5) below, the fire-catching timing (IA) is calculated from the ignition timing (IG) and the ignition delay (IgDly). In the equation (5), "0" denotes an initial value.

$P_{cyl}(0)=P_{in}$

Ang(0)=−180

IA=IG+IgDly (5)

Furthermore, the density ($\rho(0)$) of inner-cylinder gas is calculated from the filling efficiency (Ec), the total EGR ratio (EGR), and the inner-cylinder volume (V(0)); then, the initial value (Tcyl(0)) of the inner-cylinder temperature is calculated by use of the state equation (6) below.

$$P_{cyl} = \rho RT_{cyl}$$

$$\therefore T_{cyl}(0) = \frac{P_{cyl}(0)}{\rho(0)R}$$ (6)

In the equation (6), R is a gas constant. As far as the inner-cylinder volume (V) is concerned, it may be allowed that the respective inner-cylinder volumes for crank angles are preliminarily obtained based on a crank-to-piston mechanism and stored in a matrix, and then when being utilized, the inner-cylinder volume (V) corresponding to the crank angle (Ang) is referred, or it may be allowed that each time being utilized, the inner-cylinder volume (V) is obtained based on the crank-to-piston mechanism.

In the step 602, the crank angle is updated. The amount of crank angle update may be, for example, 1 [degCA]. In this regard, however, when it is required to reduce the amount of calculation in a high-rotation range, it may be allowed that the amount of crank angle update is set to 2 [degCA] in accordance with the engine rotation speed; in contrast, in the case a low-rotation range or in the case of the ECU 17 that has a margin for calculation processing capability, it may be allowed that the amount of crank angle update is set to 0.5[degCA].

In the step 603, calculation of a polytropic change is implemented by use of the inner-cylinder pressure and the inner-cylinder temperature at a time when the crank angle has not been updated, in order to calculate the inner-cylinder pressure and the inner-cylinder temperature at the present crank angle. Specifically, letting (i) and (i−1) denote the present crank angle and the unupdated crank angle, respectively, the polytropic change can be calculated through the equation (7) below.

$$P_{cyl}(i)V(i)^n = P_{cyl}(i-1)V(i-1)^n,$$ (7)

-continued $$T_{cyl}(i)V(i)^{n-1} = T_{cyl}(i-1)V(i-1)^{n-1}$$

$$\therefore P_{cyl}(i) = P_{cyl}(i-1) \cdot \left(\frac{V(i-1)}{V(i)}\right)^n,$$

$$T_{cyl}(i) = T_{cyl}(i-1) \cdot \left(\frac{V(i-1)}{V(i)}\right)^{n-1}$$

As described later, this calculation is implemented in each of the combusted portion and the non-combusted portion inside the cylinder.

In the step 604, it is determined whether or not the present crank angle (Ang(i)) is larger than the crank angle at the fire-catching timing (IA), i.e., whether or not the present crank angle (Ang(i)) has exceeded the crank angle at the fire-catching timing (IA). In this situation, in the case where the present crank angle (Ang(i)) has not exceeded the crank angle at the fire-catching timing (IA), the step 604 is directly followed by the step 609; however, in the case where the present crank angle (Ping (i)) has exceeded the crank angle at the fire-catching timing (IA), the step 604 is followed by the step 605. In the step 605, it is determined whether or not the present combusted portion volume (Vb(i)) is smaller than the present inner-cylinder volume (V(i)), i.e., whether or not the combustion has been completed. In this situation, in the case where combusted portion volume (Vb(i)) is the same as the inner-cylinder volume (V(i)), the combustion has been completed; thus, the step 605 is directly followed by the step 609. In contrast, in the case where the combustion has not been completed, the step 605 is followed by step 605.

Figure 7:
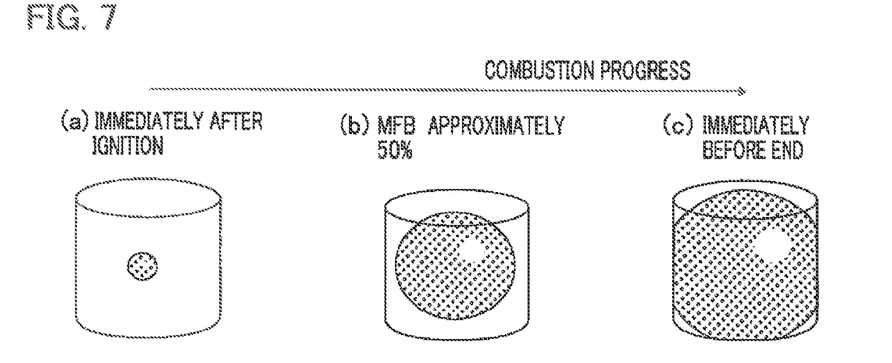
FIG. 7 is a chart schematically illustrating inner-cylinder flame growth.

In the step 606, a flame surface area (Sb) is calculated; then, in the step 607, a combusted portion volume (Vb) is calculated. Here, how to comprehend a flame shape in Embodiment 1 will be explained with reference to FIG. 7. FIGS. 7(a), 7(b), and 7(c) are a set of charts schematically illustrating inner-cylinder flame growth. The column and the internal globe in each of FIGS. 7(a), 7(b), and 7(c) schematically illustrate an inner-cylinder shape and a flame, respectively.

FIGS. 7(a), 7(b), and 7(c) are imaginary charts illustrating a flame at a time immediately after ignition has been implemented, a flame at a time when the combustion rate (MFB) has reached to approximately 50%, and flame at a time immediately before the combustion ends, respectively; these charts represent a flame expanding with respect to the gap portion of the ignition plug at the combustion velocity (Vcomb). By considering the growth of a flame in this manner, inner-cylinder combustion can be simulated. The flame does not need to be spherical; it may be regarded as a revolving ellipsoid in which the equator-direction (corresponding to the horizontal direction in FIGS. 7 (a), 7 (b), and 7 (c)) radius thereof and the pole-direction (corresponding to the vertical direction in FIGS. 7 (a), 7 (b), and 7 (c)) radius are different from each other. In that case, for example, the combustion velocity at which a flame grows in the pole direction may be calculated by multiplying the combustion velocity (Vcomb) by a predetermined value. In the case where a flame makes contact with the inner-cylinder wall surface, the combustion at that portion is regarded as being completed, and that portion is excluded from calculation of a flame surface area and a combusted portion volume.

Figure 8:
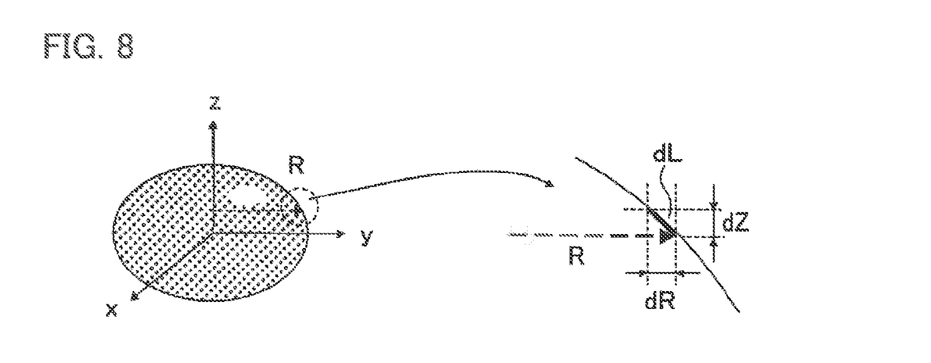
FIG. 8 is a chart schematically representing a method of calculating the surface area of flame.

Based on the foregoing way of thinking, a method of calculating the flame surface area (Sb) in the step 606 will be explained with reference to FIG. 8. FIG. 8 is a chart schematically representing the method of calculating the surface area of flame. Taking a revolving ellipsoid whose center is the gap portion of the ignition plug into consideration and, as represented in FIG. 8, letting, as represented in FIG. 8, each of the x axis and the y axis and "a" denote the equator direction of the revolving ellipsoid and the radius thereof, respectively, and letting the z axis and "b" denote the vertical direction and the radius thereof, the radius R of a cross section taken along a plane that is perpendicular to the z axis is given by the equation (8) below; thus, when being calculated by use of the radius R, the length dL of a minute portion on the surface of the revolving ellipsoid is given by the equation (9) below.

$$\frac{x^2}{a^2} + \frac{y^2}{a^2} + \frac{z^2}{b^2} = 1 \tag{8}$$

$$x^2 + y^2 = a^2 \cdot \left(1 - \frac{z^2}{b^2}\right) = R^2$$

$$\therefore R = a \cdot \sqrt{1 - \frac{z^2}{b^2}}$$

$$dL = \sqrt{dz^2 + dR^2} = \sqrt{1 + \left(\frac{dR}{dz}\right)^2} dz \tag{9}$$

Furthermore, the area dS obtained by making the length dL revolve on the z axis is given by the equation (10) below.

$$dS = 2\pi R \cdot dL = 2\pi R \cdot \sqrt{1 + \left(\frac{dR}{dz}\right)^2} dz \tag{10}$$

By implementing numerical integration of the equation (10) up to the z-axis-direction height of a flame, the ECU 17 can calculate the flame surface area (Sb(i)) at the present crank angle. Because as described above, the combustion at the portion where a flame has made contact with the inner-cylinder wall surface is regarded as being completed, it is required to exclude that portion from the numerical integration.

Figure 9:
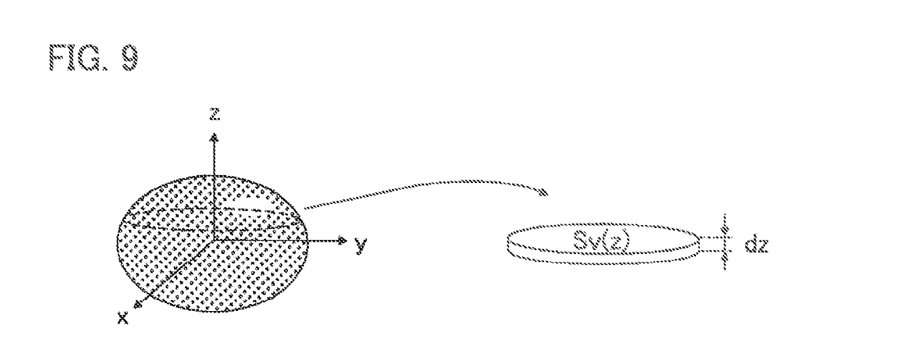
FIG. 9 is a chart schematically representing a method of calculating the volume of flame.

Next, a method of calculating the combusted portion volume (Vb) in the step 607 will be explained with reference to FIG. 9. FIG. 9 is a chart schematically representing the method of calculating a combusted portion volume. As is the case with calculation of a surface area, the cross-sectional area Sv of a cross section taken along a plane that is perpendicular to a given axis can be expressed by the equation (11) below.

$$S_V(z) = \pi \cdot R^2 = \pi \cdot a^2 \cdot \left(1 - \frac{z^2}{b^2}\right) \tag{11}$$

By implementing numerical integration of the equation (11) multiplied by the minute height dz up to the z-axis-direction height of the combusted portion, the ECU 17 can calculate the combusted portion volume (Vb (i)) at the present crank angle. Because the combusted portion exists up to the inner-cylinder wall surface, it is required to eliminate the portion that exceeds the inner-cylinder wall surface from the numerical integration.

In such a manner as described above, the flame surface area (Sb) and the combusted portion volume (Vb) are calculated in the steps 606 and 607, respectively. In Embodiment 1, there has been described a case where the shape of a flame is regarded as a revolving ellipsoid; it may be allowed to regard the shape of a flame as an ellipsoid or a sphere. An ellipse is characterized in that all the lengths of the x-axis-direction, y-axis-direction, and z-axis-direction diameters are different from one another; a revolving ellipsoid is characterized in that the lengths of any two of the diameters are identical; a sphere is characterized in that all the lengths of the diameters are identical. In Embodiment 1, each of these objects is collectively referred to as an ellipsoid.

Figure 10:
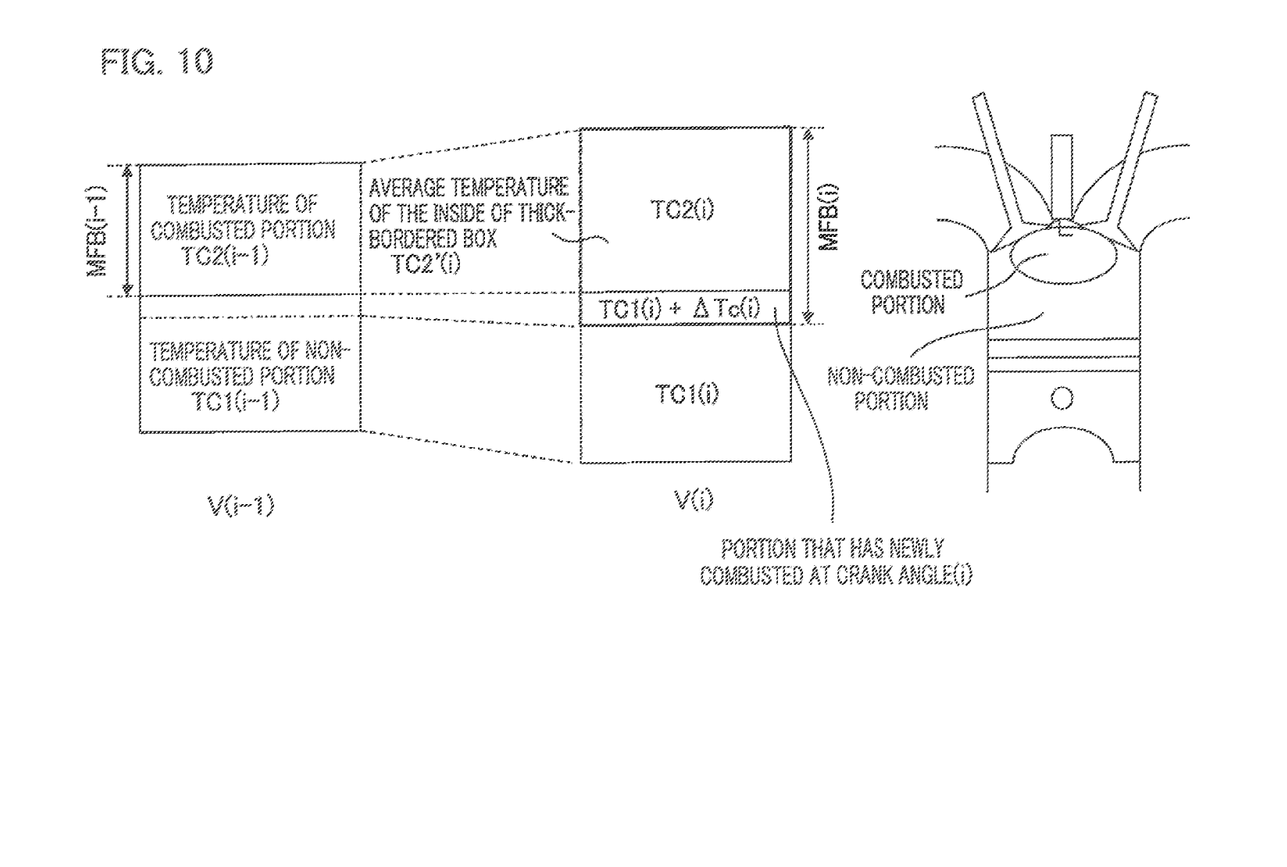
FIG. 10 is a chart schematically representing a method of calculating the temperature of an inner-cylinder combusted portion.

In the step 608, the inner-cylinder pressure and the inner-cylinder temperature are calculated. At first, a method of calculating the inner-cylinder temperature will be explained with reference to FIG. 10. FIG. 10 is a chart schematically representing a method of calculating the temperatures of a combusted portion, a non-combusted portion and a newly combusted portion. As represented in FIG. 10, in the method according to Embodiment 1, the combusted portion, the non-combusted portion, and the newly combusted portion are separately considered; with regard to the non-combusted portion and the combusted portion, the inner-cylinder temperature (Tc1 (i)) of the non-combusted portion and the inner-cylinder temperature (Tc2 (i)) of the combusted portion at the present crank angle are calculated, as represented in the equation (12), from the inner-cylinder temperature (Tc1 (i−1)) of the non-combusted portion and the inner-cylinder temperature (Tc2 (i−1)) of the combusted portion at a time before the crank angle is updated, based on the polytropic change represented in the equation (7). With regard to the newly combusted portion, the inner-cylinder temperature of the newly combusted portion is calculated by considering the temperature rise (ΔTc(i)) caused by a heat quantity generated through the combustion, in addition to the temperature (Tc1 (i)) of the non-combusted portion. Then, the final value (Tc2' (i)) of the inner-cylinder temperature of the combusted portion at the present crank angle is calculated based on the inner-cylinder temperature (Tc2 (i)) of the combusted portion, the temperature (Tc1 (i)+ΔTc (i)) of the newly combusted portion, and the combustion rate (MFB).

$$T_{c1}(i) = T_{c1}(i-1) \cdot \left(\frac{V(i-1)}{V(i)}\right)^{n-1} \quad (12)$$

$$T_{c2}(i) = T_{c2}(i-1) \cdot \left(\frac{V(i-1)}{V(i)}\right)^{n-1}$$

$$T'_{c2}(i) = \frac{MFB(i-1)}{MFB(i)} \cdot T_{c2}(i) + \left(1 - \frac{MFB(i-1)}{MFB(i)}\right) \cdot (T_{c1}(i) + \Delta T_c(i))$$

The combustion rate (MFB (i)) at the present crank angle can be calculated through the equation (13) below by use of the combusted portion volume (Vb (i)) and the inner-cylinder volume (V (i))

$$MFB(i) = \frac{Vb(i)}{V(i)} \quad (13)$$

The temperature rise (ΔTc(i)) caused by a heat quantity (ΔQ(i)) generated through combustion can be calculated by the equation (14) below by use of an isochoric specific heat (Cv). The heat quantity (ΔQ(i): corresponding to the heat generation rate) generated by the combustion can be calculated based on the changing amount of the combusted portion volume (ΔVb(i)=Vb(i)−Vb(i−1)) between the combusted portion volume at the present crank angle and the combusted portion volume at the unupdated crank angle, an inner-cylinder fuel density (ρf(i)=ρ(i)/(1+AFR)), and the fuel heat quantity (HVF)

$$\Delta Q = Cv \cdot \Delta Tc \quad (14)$$
$$\Delta Q(i) = \Delta V_b(i) \cdot \rho_f(i) \cdot HVF$$
$$\therefore \Delta Tc = \frac{\Delta Q}{Cv} = \frac{\Delta V_b(i) \cdot \rho_f(i) \cdot HVF}{Cv}$$

Based on the inner-cylinder temperature (Tc1 (i)) of the non-combusted portion, the inner-cylinder temperature (Tc2' (i)) of the combusted portion, and the combustion rate (MFB(i)), the whole-inner-cylinder temperature (Tcyl(i)) is calculated by the equation (15) below.

$$T_{cyl} = MFB(i) \cdot T_{c2}'(i) + (1 - MFB(i)) \cdot T_{c1}(i) \quad (15)$$

The peak hold value (ΔQph) of the calculated heat generation rate (ΔQ (i)) is calculated and when the difference between the peak hold value (ΔQph) and the heat generation rate (ΔQ(i)) becomes the same as or larger than a predetermined value, the peak position of the heat generation rate is detected and the combustion velocity is corrected in such a way as to gradually decrease; thus, the behavior of the combustion velocity, explained with reference, to FIG. 5C, can more accurately be simulated.

Next, a method of calculating the inner-cylinder pressure will be explained. With regard to the non-combusted portion, from the inner-cylinder pressure (Pc1 (i−1)) of the non-combusted portion at a time before the crank angle is updated, the inner-cylinder pressure (Pc1 (i)) of the non-combusted portion at the present crank angle is calculated through the equation (16) below, based on the polytropic change represented in the equation (7).

$$P_{c1}(i) = P_{c1}(i-1) \cdot \left(\frac{V(i-1)}{V(i)}\right)^n \quad (16)$$

The final value (Pc1'(i)) of the inner-cylinder pressure of the combusted portion is calculated by use of the state equation (17) below, based on the final value (Tc2'(i)) of the inner-cylinder temperature the combusted portion at the present crank angle.

$$P_{c2}'(i) = \rho(i) R T_{c2}' \quad (17)$$

Based on the inner-cylinder pressures (Pc1 (i)) and (Pc2' (i)), calculated in such a manner as described above, of the non-combusted portion and the combusted portion and the combustion rate (MFB(i)), the whole-inner-cylinder pressure (Pcyl(i)) is calculated by the equation (18) below.

$$P_{cyl} = MFB(i) \cdot P_{c2}'(i) + (1 - MFB(i)) \cdot P_{c1}(i) \quad (18)$$

In the step 608, the inner-cylinder pressure and the inner-cylinder temperature are calculated in such a manner as described above. In the step 609, the present crank angle (Ang (i)) is compared with the ending angle (+180 [degCA]), which is the ending point (bottom dead center) of the power stroke; then, in the case where the present crank angle (Ang (i)) has reached the ending angle (+180 [degCA]), the processing is ended; in the case where the present crank angle (Ang (i) has not reached the ending angle (+180 [degCA]), the step 609 is followed by the step 602, where the crank angle is updated.

The simulation of combustion is implemented by the combustion simulation unit 23 in such a manner as described above, so that the phenomenon that an inner-cylinder flame expands in an ellipsoidal manner is simulated; therefore, the behavior of an inner-cylinder-pressure change in accordance with the inner-cylinder shape can readily be reproduced and hence the heat generation rate and the combustion rate can also readily be calculated; thus, the behavior of an inner-cylinder-pressure change in accordance with the position of the ignition plug can also readily be reproduced.

Meanwhile, the explanation made heretofore is based on the assumption that the combustion velocity of a flame is known. Hereinafter, by use of the combustion simulation that has been explained heretofore, there will be explained a method of calculating the combustion velocity from an inner-cylinder pressure measured under an operation condition that is preliminarily determined through a DoE or the like.

Figure 11:
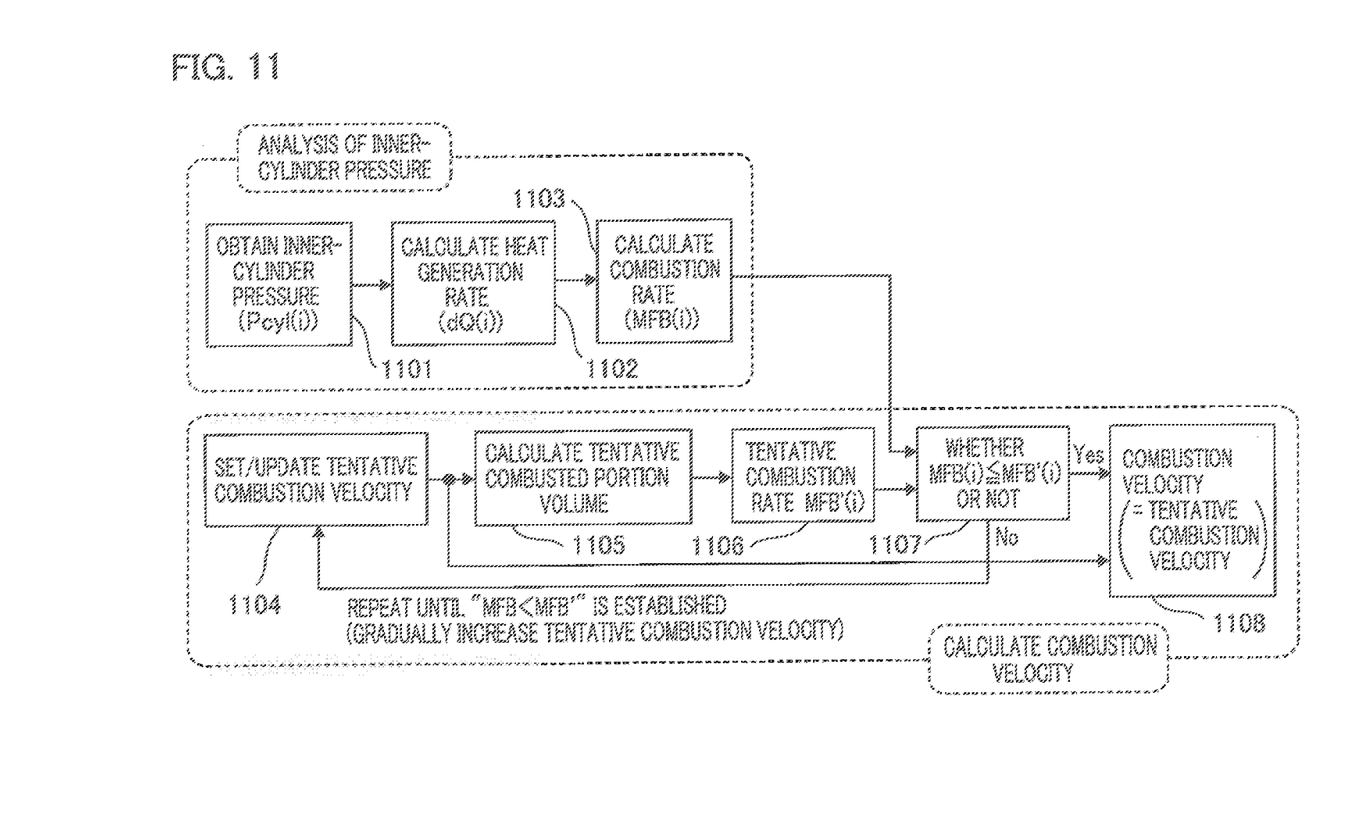
FIG. 11 is a block diagram illustrating a method of calculating the combustion velocity from an inner-cylinder pressure.

FIG. 11 is a block, diagram illustrating the method of calculating the combustion velocity from an inner-cylinder pressure. In the blocks 1101 through 1103, the heat generation rate (dQ) and the combustion rate (MFB) are calculated from inner-cylinder pressure data. In general, in order to calculate the heat generation rate (dQ(i)) at the present crank angle from the inner-cylinder pressure data, the equation (19) below is utilized.

$$dQ(i) = \frac{n}{n-1} \cdot P_{cyl}(i) \cdot dV(i) + \frac{1}{n-1} \cdot V(i) \cdot dP_{cyl}(i) \quad (19)$$

Each of the volume changing amount (dV (i)) and the inner-cylinder-pressure changing amount (dPcyl(i)) can be calculated from the difference between the immediately previous crank angle data and the immediately subsequent crank angle data.

The combustion rate (MFB(i)) at the present crank angle can be calculated as the ratio, represented by the equation (20) below, of the integration value (Q(i)) obtained by integrating the heat generation rate up to the present crank angle to the whole integration value (Qall) of the heat generation rate.

$$MFB(i) = \frac{Q(i)}{Q_{all}} = \frac{\sum_{k=-180}^{i} dQ(k)}{\sum_{k=-180}^{180} dQ(k)} \quad (20)$$

In such a way as described above, the heat generation rate (dQ) and the combustion rate (MFB) are preliminarily calculated from inner-cylinder pressure data within a crank angle of 360 [degCA] from the start of the compression stroke (the bottom dead center) to the end of the power stroke (the bottom dead center).

Next, the combustion velocity is calculated by use of the combustion simulation represented in FIG. 6; however, a more specific method of calculating the combustion velocity is illustrated in the blocks 1104 through 1108 in FIG. 11.

The blocks 1104 through 1108 in FIG. 11 is performed every crank angle of 360 [degCA] from the start of the compression stroke (the bottom dead center) to the end of the power stroke (the bottom dead center). In the block 1104, a tentative combustion velocity is set and updated. When the real combustion velocity is unknown, a combustion velocity is set as a tentative value, and the combustion simulation represented in FIG. 6 is performed by use of the tentative combustion velocity. In Embodiment 1, at first, the initial setting is implemented with the tentative combustion velocity of "0". In the blocks 1105 and 1106, the tentative combusted portion volume and the tentative combustion rate (MFB'(i)), respectively, are calculated by use of the tentative combustion velocity; for this calculation, the foregoing combustion simulation represented in FIG. 6, especially, the method in the step 607 is utilized. In the block 1107, the tentative combustion rate (MFB'(i)) and the combustion rate (MFB(i)) calculated from the inner-cylinder pressure data at the present crank angle are compared with each other. The block 1106 is a tentative combustion rate calculation unit, and the block 1108 is a real combustion velocity derivation unit.

When the present timing is before combustion starts (before the fire-catching timing), both the combustion rate (MFB (i)) calculated from the inner-cylinder pressure data and the tentative combustion rate (MFB'(i)) are "0" and hence the inequality is established; therefore, the block 1107 is followed by the block 1108, where the tentative combustion velocity is stored as the combustion velocity (Vcomb (i)) at the present crank angle. When the combustion has started and the tentative combustion velocity is left to be a value that has initially been set, the combustion rate (MFB) calculated from the inner-cylinder pressure data is larger than the tentative combustion rate (MFB' (i)); therefore, the block 1107 is followed by the block 1104, where a predetermined value is added to the tentative combustion velocity so as to update the tentative combustion velocity; then, the calculations in the blocks 1105 and 1106 are performed. This process is repeated until the condition in the block 1107 is established, so that there can be obtained the combustion velocity at which the tentative combustion rate (MFB'(i)) and the combustion rate (MFB (i)) calculated from the inner-cylinder pressure data are identical. It should be understood that when combustion simulation is performed by use of the combustion velocity (Vcomb (i)) for each crank angle, the simulation result that is approximately the same as the measured inner-cylinder pressure data can be obtained.

Meanwhile, in the case where the combustion velocity is calculated in such a manner, an initial surge or something like that may occur, as represented in FIG. 5C, when the combustion velocity rises. Accordingly, the average value of the portion excluding the initial surge portion and the gradually decreasing portion at the latter part of the combustion is defined as the combustion velocity and then the ignition delay is also corrected in such a way that the portion surrounded by the crank angle and that combustion velocity remains identical, so that the ignition delay and the combustion velocity for the measured inner-cylinder pressure data can be calculated.

In such a manner as described above, the ignition delay and the combustion velocity suitable to the combustion simulation according to Embodiment 1 can be calculated and hence matching utilizing the inner-cylinder pressure data can readily be implemented; thus, the ignition delay can more accurately be fitted.

As described above in detail, an internal combustion engine inner-cylinder pressure estimation apparatus according to Embodiment 1 includes an operation condition detection unit that detects an operation condition of an internal combustion engine, an ignition delay calculation unit that calculates an ignition delay, which is an interval from an ignition timing to a starting timing of heat generation by combustion, based on the operation condition detected by the operation condition detection unit, and a combustion velocity calculation unit that calculates a combustion velocity, based on the operation condition; the internal combustion engine inner-cylinder pressure estimation apparatus is characterized in that there is simulated a phenomenon that after an ignition delay period following an ignition timing has elapsed, a flame generated at the gap portion of an ignition plug expands up to the inner-cylinder wall surface at the combustion velocity and in the shape of an ellipsoid whose center is the gap portion of the ignition plug, in that the inside and the outside of the flame are defined as a combusted portion and a non-combusted portion, respectively, and respective inner-cylinder pressures of the combusted portion and the non-combusted portion are calculated, and in that the whole inner-cylinder pressure is estimated based on the inner-cylinder pressures of the combusted portion and the non-combusted portion.

In this configuration, the phenomenon that an 1 cylinder flame expands in an ellipsoidal manner is simulated; therefore, the behavior of an inner-cylinder-pressure change in accordance with the inner-cylinder shape can readily be reproduced.

An internal combustion engine inner-cylinder pressure estimation apparatus according to Embodiment 1 is characterized in that a heat generation rate is calculated based on the amount of a change in the volume of a flame.

With this configuration, when it is desired to calculate only the heat generation rate, the heat generation rate can be calculated without calculating the inner-cylinder pressure.

Moreover, an internal combustion engine inner-cylinder pressure estimation apparatus according to Embodiment 1 is characterized in that a heat generation rate is calculated based on the amount of a change in the volume of a flame, in that the inner-cylinder temperature of a combusted portion is calculated based on a heat quantity calculated based on the heat generation rate, in that the inner-cylinder pressure of the combusted portion is calculated based on the inner-cylinder temperature of the combusted portion, and in that the whole inner-cylinder pressure is estimated based on the inner-cylinder pressure of a non-combusted portion, the inner-cylinder pressure of the combusted portion, and a combustion rate.

With this configuration, the inner-cylinder pressure can be estimated based on the calculated heat generation rate and the combustion rate.

Furthermore, an internal combustion engine inner-cylinder pressure estimation apparatus according to Embodiment 1 is characterized in that after the peak timing of a heat generation rate, a combustion velocity gradually decreases.

With this configuration, the behavior of an inner-cylinder-pressure change in an interval from the peak timing of the heat generation rate to the ending timing of combustion of non-combusted gas can readily be reproduced.

Still moreover, an internal combustion engine inner-cylinder pressure estimation apparatus according to Embodiment 1 is characterized in that a combustion rate is calculated based on the volume of a flame shape and an inner-cylinder volume.

With this configuration, when it is desired to calculate only the heat generation rate, the heat generation rate can be calculated without calculating an inner-cylinder pressure and a heat generation rate.

Furthermore, an internal combustion engine inner-cylinder pressure estimation apparatus according to Embodiment 1 is characterized by having, as a method of fitting the combustion velocity with the ignition delay, a tentative combustion rate calculation unit that calculates a tentative combustion rate by simulating the phenomenon, by use of an arbitrarily changeable tentative combustion velocity, that a flame expands in an ellipsoidal manner; a real combustion velocity derivation unit that changes a tentative combustion velocity until a real combustion rate calculated from a preliminarily measured inner-cylinder pressure and the tentative combustion rate approximately coincide with each other and that derives, as a real combustion velocity, the tentative combustion velocity at a time when the real combustion rate and the tentative combustion rate approximately coincide with each other; a real ignition delay period calculation unit that calculates, as a real ignition delay, a period that is after ignition and in which the real combustion velocity is zero; and a combustion velocity approximation unit and an ignition delay approximation unit that can approximate the real combustion velocity and the real ignition delay, respectively.

With this configuration, fitting of the inner-cylinder pressure estimation apparatus can readily be performed.

Moreover, an internal combustion engine inner-cylinder pressure estimation apparatus according to Embodiment 1 is characterized in that with regard to an initial surge portion, of the real combustion velocity, that is caused by the fitting method, the ignition delay is corrected in such a way that when the combustion velocity is constant, the combustion amount remains the same.

With this configuration, fitting of the ignition delay can more accurately be performed.

An internal combustion engine inner-cylinder pressure estimation apparatus according to Embodiment 1 of the present invention has been explained; however, in the scope of the present invention, the embodiments thereof can appropriately be modified or omitted. For example, the main point of the combustion simulation method described herein is to regard a flame as an ellipsoid; thus, it is also made possible that when the quantity of heat generated by combustion is calculated, thermal dissociation (the phenomenon in which water or a carbon dioxide partially reacts in a reverse direction at high temperature, for example, during a combustion period) or creation of a nitrogen oxide ($NO_x$) is taken into consideration based, for example, on a chemical reaction formula, and then the combustion simulation is extended to a combustion model in which a temperature fall caused by such an endothermic reaction is taken into consideration. Furthermore, it is also made possible that the combustion simulation is extended to a combustion model in which a cooling loss caused by heat radiating to an inner-cylinder wall surface is taken into consideration; thus, it should be understood that the present invention is not limited to the illustrative embodiments set forth herein.

What is claimed is:

1. An internal combustion engine inner-cylinder pressure estimation apparatus comprising:
   an electronic control unit (ECU) configured to
   detect an operation condition of an internal combustion engine;
   calculate an ignition delay that is an interval from an ignition timing to a starting timing of heat generation by combustion, based on the detected operation condition;
   calculate a combustion velocity, based on the operation condition; and estimate an inner-cylinder pressure by:
  simulating a flame surface area of a flame generated at a gap portion of an ignition plug after an ignition delay period following an ignition timing has elapsed, as a revolving ellipsoid having a center at the gap portion of the ignition plug and expanding to an inner-cylinder wall surface at the combustion velocity,
  calculating the flame surface area based on a simulation result,
  calculating respective inner-cylinder pressures of a combusted portion and a non-combusted portion based on the calculated flame surface area, the combusted portion and the non-combusted portion corresponding to an inside area and an outside area of the simulated flame surface area, respectively, and
  estimating the inner-cylinder pressure based on the inner-cylinder pressures of the combusted portion and the non-combusted portion.

2. The internal combustion engine inner-cylinder pressure estimation apparatus according to claim 1, wherein a heat generation rate is calculated based on a changing amount of the volume of the flame.

3. The internal combustion engine inner-cylinder pressure estimation apparatus according to claim 1,
  wherein a heat generation rate is calculated based on a changing amount of the volume of the flame,
  wherein an inner-cylinder temperature of the combusted portion is calculated based on a heat quantity calculated from the heat generation rate,
  wherein an inner-cylinder pressure of the combusted portion is calculated based on the inner-cylinder temperature of the combusted portion, and
  wherein the inner-cylinder pressure is estimated based on the inner-cylinder pressure of the non-combusted portion, the inner-cylinder pressure of the combusted portion, and a combustion rate.

4. The internal combustion engine inner-cylinder pressure estimation apparatus according to claim 2, wherein the combustion velocity gradually decreases after the heat generation rate has reached the peak thereof.

5. The internal combustion engine inner-cylinder pressure estimation apparatus according to claim 3, wherein the combustion rate is calculated based on the volume of the flame and an inner-cylinder volume.

6. The internal combustion engine inner-cylinder pressure estimation apparatus according to claim 1, wherein the ECU is further configured to fit the combustion velocity with the ignition delay by:
  calculating a tentative combustion rate by simulating a phenomenon, by use of an arbitrarily changeable tentative combustion velocity, that a flame expands in an ellipsoidal manner;
  changing a tentative combustion velocity until a real combustion rate calculated from a preliminarily measured inner-cylinder pressure and the tentative combustion rate approximately coincide with each other and that derives, as a real combustion velocity, the tentative combustion velocity at a time when the real combustion rate and the tentative combustion rate approximately coincide with each other;
  calculating, as a real ignition delay, a period that is after ignition and in which the real combustion velocity is zero; and
  approximating the real combustion velocity and the real ignition delay, respectively.

7. The internal combustion engine inner-cylinder pressure estimation apparatus according to claim 1, wherein the ECU is further configured to fit the combustion velocity with the ignition delay by:
  calculating a tentative combustion rate by simulating a phenomenon, by use of an arbitrarily changeable tentative combustion velocity, that a flame expands in an ellipsoidal manner;
  changing a tentative combustion velocity until a real combustion rate calculated from a preliminarily measured inner-cylinder pressure and the tentative combustion rate approximately coincide with each other and that derives, as a real combustion velocity, the tentative combustion velocity at a time when the real combustion rate and the tentative combustion rate approximately coincide with each other;
  calculating, as a real ignition delay, a period that is after ignition and in which the real combustion velocity is zero; and
  approximating the real combustion velocity and the real ignition delay, respectively, wherein with regard to an initial surge portion, of the real combustion velocity, that is caused by the fitting method, the ignition delay is corrected in such a way that when the combustion velocity is constant, the combustion amount remains the same.

* * * * *